US012608966B2

(12) United States Patent
Jain et al.

(10) Patent No.: US 12,608,966 B2
(45) Date of Patent: Apr. 21, 2026

(54) SYSTEMS AND METHODS FOR DESIGN AWARE REPLACEMENT FONT SUGGESTIONS

(71) Applicant: ADOBE INC., San Jose, CA (US)

(72) Inventors: Sanyam Jain, New Delhi (IN); Rishav Agarwal, Bengaluru (IN); Aditya Garg, New Delhi (IN)

(73) Assignee: Adobe Inc., San Jose, CA (US)

( * ) Notice: Subject to any disclaimer, the term of this patent is extended or adjusted under 35 U.S.C. 154(b) by 349 days.

(21) Appl. No.: 18/465,740

(22) Filed: Sep. 12, 2023

(65) Prior Publication Data

US 2025/0087006 A1     Mar. 13, 2025

(51) Int. Cl.
*G06V 30/194* (2022.01)
*G06F 40/109* (2020.01)
*G06V 30/244* (2022.01)
*G06V 30/412* (2022.01)

(52) U.S. Cl.
CPC .......... *G06V 30/194* (2022.01); *G06F 40/109* (2020.01); *G06V 30/245* (2022.01); *G06V 30/412* (2022.01)

(58) Field of Classification Search
None
See application file for complete search history.

(56) References Cited

U.S. PATENT DOCUMENTS 6,268,611 B1 *   7/2001   Pettersson ............... G06T 3/403
                                                382/284
8,416,243 B2 *   4/2013   Plummer .............. G06F 40/109
                                                345/467

8,693,789 B1 *   4/2014   Seitz ......................... G06T 7/33
                                                382/209
9,370,307 B2 *   6/2016   Wada ................... A61B 5/0095
9,501,724 B1 *  11/2016   Yang ......................... G06N 3/08
2009/0263019 A1 *  10/2009   Tzadok .............. G06V 30/1914
                                                382/176

(Continued)

OTHER PUBLICATIONS

Wang Z, Yang J, Jin H, Shechtman E, Agarwala A, Brandt J, Huang TS. Deepfont: Identify your font from an image. InProceedings of the 23rd ACM international conference on Multimedia Oct. 13, 2015 (pp. 451-459).

*Primary Examiner* — Helen Zong
(74) *Attorney, Agent, or Firm* — Shook, Hardy & Bacon L.L.P.

(57)          ABSTRACT

In various embodiments, systems and methods for design-aware replacement font suggestions are provided. In some embodiments, a substitute font-suggestion algorithm holistically considers how the original string of text from the original layout appears when re-rendered in a same-sized text frame using a potential replacement font. In some embodiments, the substitute font-suggestion algorithm generates a first image of a text frame including the text string using the first font and generates a plurality of second images of the text string using candidate replacement fonts. A ranking of the candidate replacement fonts is generated based on computing a score for each of the individual second images that represents similarity between the first image and the individual second images. Based on the assessed similarities, a ranked listing of substitute font suggestions is displayed.

20 Claims, 9 Drawing Sheets

(56) References Cited

U.S. PATENT DOCUMENTS

| | | | |
|---|---|---|---|
| 2015/0077772 A1* | 3/2015 | Satou ................. | G06K 15/1825 |
| | | | 358/1.11 |
| 2019/0155872 A1* | 5/2019 | Patel ..................... | G06F 40/109 |
| 2022/0092370 A1* | 3/2022 | Aggarwal ............... | G06N 3/09 |

* cited by examiner

100

CANDIDATE SUBSTITUTE FONT:
MYANMAR SANGAM MN REGULAR     226

HOLA,

Le damos la bienvenida a sequi dolestorion ne iduciducia doloruptae parchiliciis vollige unditius ius.     334

ORIGINAL FONT:
RALEWAY REGULAR

HOLA,

Le damos la bienvenida a sequi dolestorion ne iduciducia doloruptae parchiliciis vollige unditius ius.     222     332

IMAGE ALIGNMENT ANALYSIS 242

SIMILARITY SCORE 310

ORIGINAL FONT:
RALEWAY REGULAR

410

222

HOLA,

414

412

Le damos la bienvenida a sequi dolestorion ne iduciducia doloruptae parchiliciis vollige unditius ius.

CANDIDATE SUBSTITUTE FONT:
RALEWAY MEDIUM

420

226

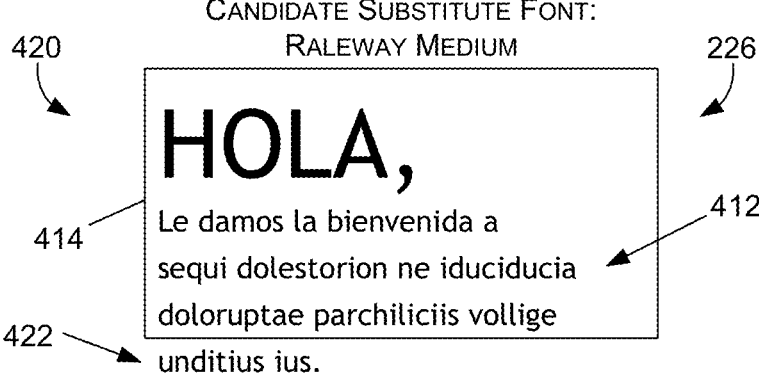

HOLA,

414

412

Le damos la bienvenida a sequi dolestorion ne iduciducia doloruptae parchiliciis vollige

422 unditius ius.

CANDIDATE SUBSTITUTE FONT:
MYANMAR SANGAM MN REGULAR

430

432

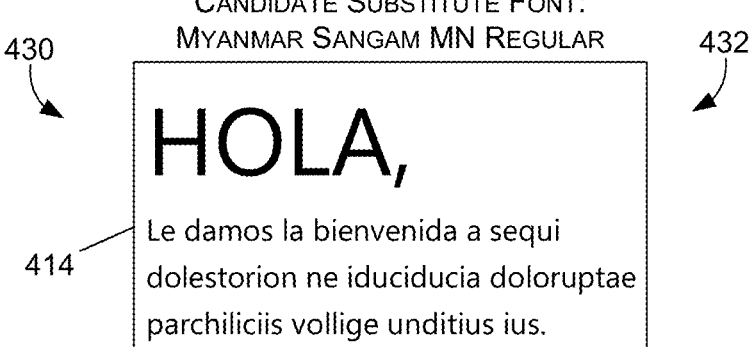

HOLA,

414

Le damos la bienvenida a sequi dolestorion ne iduciducia doloruptae parchiliciis vollige unditius ius.

Suggested Font 1
Suggested Font 2
Suggested Font 3
Suggested Font 4
Suggested Font 5
Suggested Font 6
Suggested Font 7
Suggested Font 8
Suggested Font 9
Suggested Font 10
Suggested Font 11
Suggested Font 12

520

521

522

512

250

500

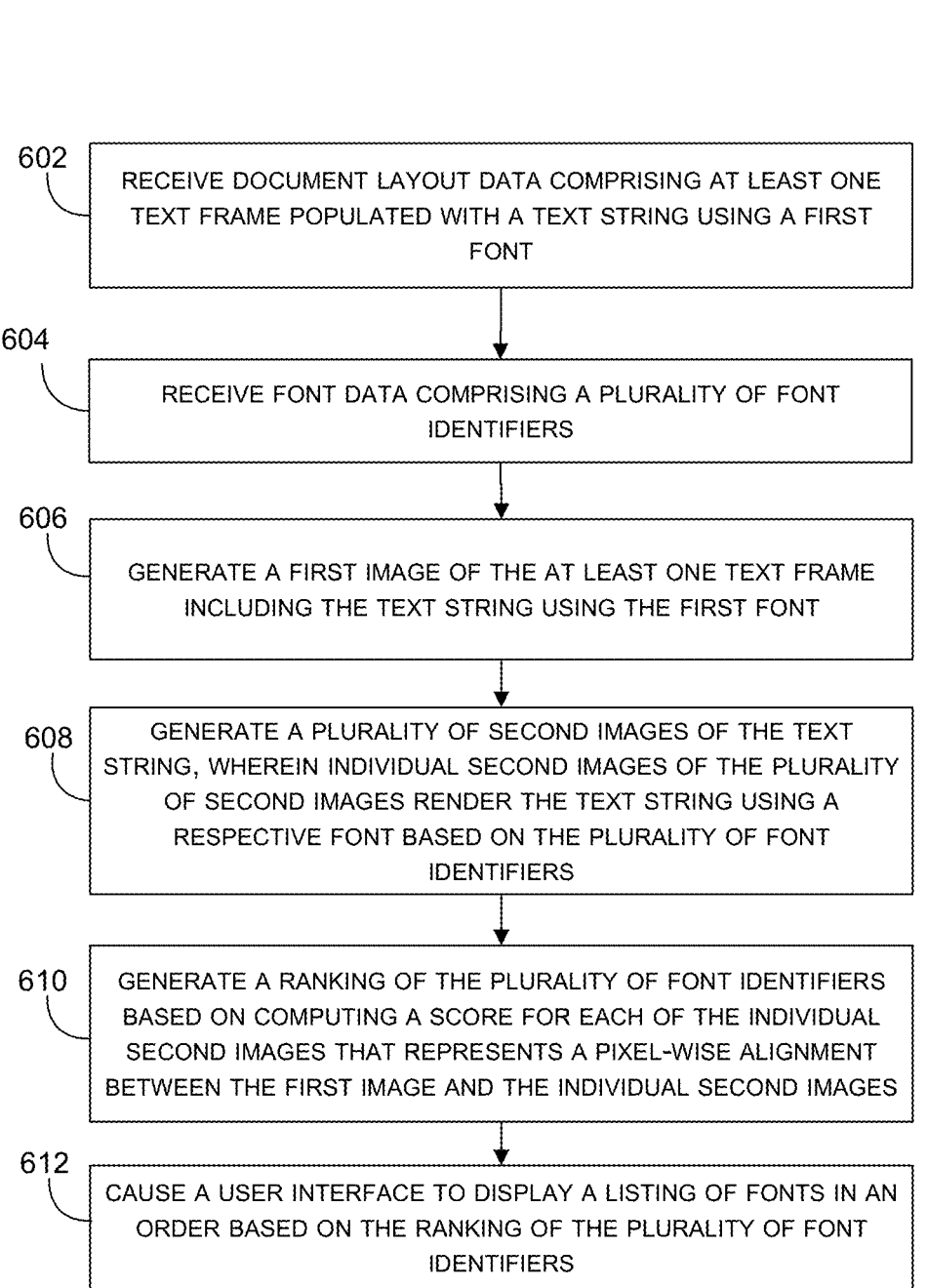

600

602 — RECEIVE DOCUMENT LAYOUT DATA COMPRISING AT LEAST ONE TEXT FRAME POPULATED WITH A TEXT STRING USING A FIRST FONT

604 — RECEIVE FONT DATA COMPRISING A PLURALITY OF FONT IDENTIFIERS

606 — GENERATE A FIRST IMAGE OF THE AT LEAST ONE TEXT FRAME INCLUDING THE TEXT STRING USING THE FIRST FONT

608 — GENERATE A PLURALITY OF SECOND IMAGES OF THE TEXT STRING, WHEREIN INDIVIDUAL SECOND IMAGES OF THE PLURALITY OF SECOND IMAGES RENDER THE TEXT STRING USING A RESPECTIVE FONT BASED ON THE PLURALITY OF FONT IDENTIFIERS

610 — GENERATE A RANKING OF THE PLURALITY OF FONT IDENTIFIERS BASED ON COMPUTING A SCORE FOR EACH OF THE INDIVIDUAL SECOND IMAGES THAT REPRESENTS A PIXEL-WISE ALIGNMENT BETWEEN THE FIRST IMAGE AND THE INDIVIDUAL SECOND IMAGES

612 — CAUSE A USER INTERFACE TO DISPLAY A LISTING OF FONTS IN AN ORDER BASED ON THE RANKING OF THE PLURALITY OF FONT IDENTIFIERS

MEMORY 712

PROCESSOR(S) 714

INFERENCE ENGINE 715

PRESENTATION COMPONENT(S) 716

RADIO(S) 724

I/O PORTS 718

I/O COMPONENTS 720

POWER SUPPLY 722

710

SYSTEMS AND METHODS FOR DESIGN AWARE REPLACEMENT FONT SUGGESTIONS

BACKGROUND

Content designers today have many tools available to them to produce content for presentation on both digital and non-digital platforms. The content they create may be used for purposes such as entertainment, marketing, and/or communicating information, among others. Using a graphics design application (e.g., Adobe® Illustrator and/or Adobe® InDesign) the content designer can tailor the look and feel of the content they create (e.g., through graphics and/or typeface selection) to carry a desired intrinsic impression to a consumer of the content to complement and/or enhance the impact of information conveyed by textual content.

SUMMARY

Embodiments presented in this disclosure provide for, among other things, systems and methods for a substitute font-suggestion algorithm that evaluates candidate replacement fonts based on how well they replicate the visual appearance of a string of textual content rendered in a text frame using an original font. The substitute font-suggestion algorithm holistically considers how the original string of text from the original layout appears when re-rendered in a same-sized text frame using a potential replacement font. This analysis is performed by rendering a first image of the original text in a text frame using the original font, rendering a second image of the original text in the text frame using a potential substitute font, and performing, for example, a pixel-wise image similarity evaluation between the first and second images to compute a score for each of the potential replacement fonts. In some of the embodiments presented in this disclosure, a substitute font-suggestion algorithm applies a text frame overset criteria to assess similarity. For example, the substitute font-suggestion algorithm evaluates the second image rendered using the potential replacement font, and determines whether use of that font causes any portion of the original text string to extend beyond the bounds of the original text frame. Based on the assessed similarities, a ranked listing of substitute font suggestions is displayed to a content designer. Those potential replacement fonts producing an image of the text most closely matching the image of the text produced using the original font are positioned higher in the ranked listing than those that less closely match.

BRIEF DESCRIPTION OF THE DRAWINGS

The embodiments presented in this disclosure are described in detail below with reference to the attached drawing figures, wherein:

FIG. 4 is a diagram illustrating text frame overset analysis, in accordance with embodiments of the present disclosure;

FIG. 6 is a flow chart illustrating an example method embodiment for generating design-aware replacement font suggestions, in accordance with embodiments of the present disclosure;

DETAILED DESCRIPTION

Figure 1:
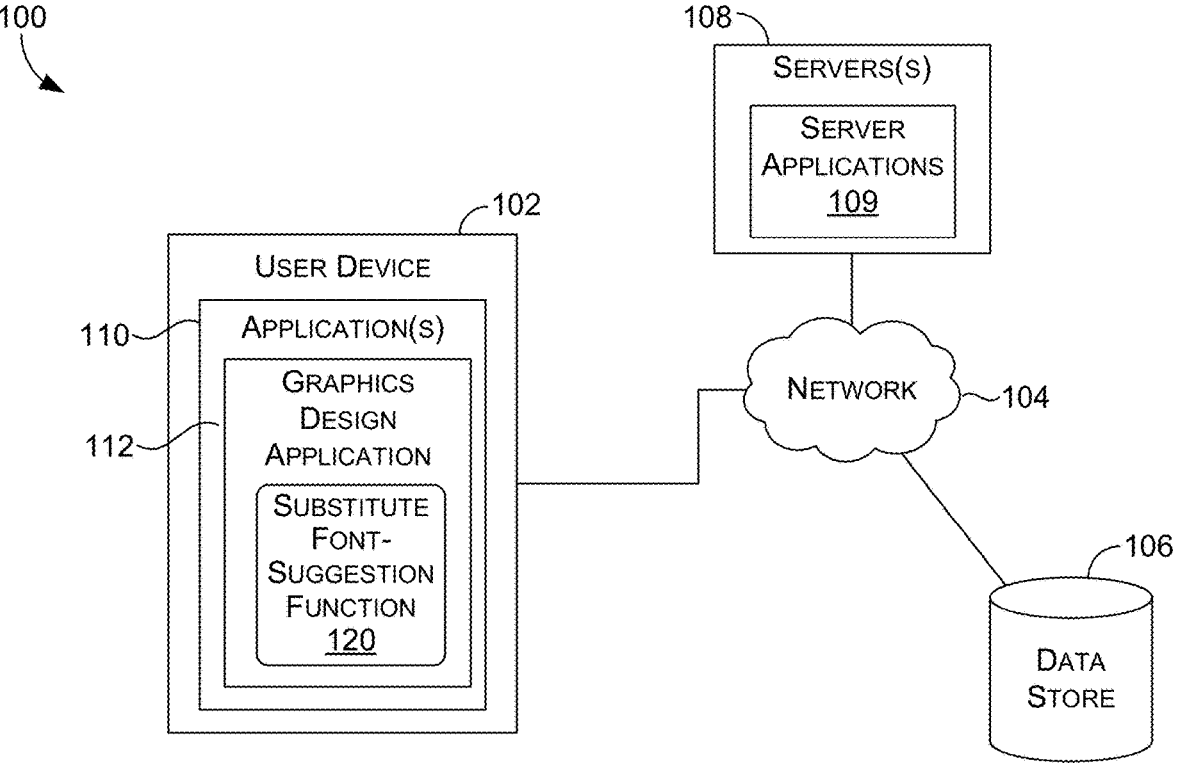
FIG. 1 is a block diagram illustrating an operating environment, in accordance with embodiments of the present disclosure.

The font selected by a content designer to display textual informal has a significant impact on the look and feel of the content and how it is received by a content consumer. The arrangement of content within the context of a document (e.g., the document's layout) also affects the effectiveness of the content in conveying information in the manner intended by the content designer. There are times when a content designer does not wish to alter the layout of their document, but needs to replace an original font used to render text in the layout using a similar looking font. For example, an original font specified for the layout may be missing from a font library available to the content designer, or may have font licensing terms or restrictions that cause the content designer to wish to replace the original font with a similar looking substitute font.

Existing technologies for generating substitute font recommendations are generally based on font similarity evaluations that perform a comparison of font characteristics. For example, in one technology, a vector is computed to represent characteristics of a standardized text string in an original font. To identify similar fonts to recommend to a content designer, a set of candidate replacement fonts is selected from a font library, and for each potential replacement font a vector is similarly computed to represent characteristics of the standardized text string in the replacement font. A potential replacement font is ranked for similarity to the original font based on how similar the vector for the replacement font is to the vector for the original font. Then, a listing of suggested substitute fonts is provided to the content designer based on which possible replacement fonts have vectors most similar to the vector of the original font.

Such existing technologies do not consider the actual content of the text being rendered, or the overall context of how that text appears within a layout. Even though the glyphs of two fonts when compared on a glyph-by-glyph comparison can appear quite similar to the human eye, small differences in glyph characteristics can accumulate so that a string of text may appear very different when rendered in a text frame of a layout, depending on which font is used. For example, a text that renders in two lines of text in a text frame using the original font might occupy three (or more) lines of text using a similar looking substitute font. The text rendered in the replacement font may appear more compressed or expanded with respect to spacing between glyphs, or have different values for ascenders, descenders, and/or tails. These and other font characteristics affect how a font, once a string of glyphs are combined together into textual context, affect a layout because small differences in the characteristics of individual glyphs accumulate. Moreover, changes in how one text frame for a layout is rendered can have undesired cascading effects on other objects within the layout, such as causing other text frames to dislodge and/or have undesired overlapping with other text frames and/or graphics object.

Embodiments of the present disclosure address, among other things, the problems associated with identifying a substitute font for use in a layout that preserves the original appearance of the layout. For example, in some embodiments, a substitute font-suggestion algorithm is disclosed that evaluates candidate replacement fonts based on how well they replicate the visual appearance of a string of textual content rendered in a text frame using an original font. The substitute font-suggestion algorithm holistically considers how the original string of text from the original layout appears when re-rendered in a same-sized text frame using a potential replacement font. This analysis is performed by rendering a first image of the original text in a text frame using the original font, rendering a second image of the original text in the text frame using a potential substitute font, and performing a pixel-wise image similarity evaluation between the first and second images to compute a score. Example algorithms for performing the image similarity evaluation include, but are not limited to, mean square error (MSE), peak signal-to-noise ratio (PSNR), and structural similarity index measurement (SSIM). This pixel-wise image similarity evaluation is performed for each of the potential replacement fonts, and a ranked listing is then displayed to the content designer based on the computed scores. Those potential replacement fonts producing an image of the text most closely matching the image of the text produced using the original font are positioned higher in the ranked listing than those that less closely match.

In some of the embodiments presented in this disclosure, the substitute font-suggestion algorithm applies a text frame overset criteria to assess similarity. For example, the substitute font-suggestion algorithm evaluates the second image rendered using the potential replacement font, and determines whether use of that font causes any portion of the original text string to extend beyond the bounds of the original text frame (referred to as a text frame overset). The substitute font-suggestion algorithm adjusts the ranked listing so that replacement fonts that cause text frame overset appear lower in the listing of recommendations than those that do not cause text frame overset. In some embodiments, the substitute font-suggestion algorithm incorporates a font-style criteria. For example, the substitute font-suggestion algorithm identifies the font style of the original font used in the layout (e.g., Bold, Italics, Regular, SemiBold, etc.) and adjusts the ranked listing of recommended fonts to favor potential replacement fonts having the same font style as the original font.

The ranked listing of suggested substitute fonts generated by a substitute font-suggestion algorithm provides the content designer with replacement font suggestions that maintain the overall visual appearance of the layout when used in place of the original font.

Advantageously, efficiencies are realized in the utilization of the computing platform, graphics design application, and other resources used by the content designer because the content designer is relieved of the need to use such resources to perform the time-consuming process of hunting though a menu of available fonts to find a replacement font that works with their existing layout, and/or does not need to alter their existing layout to accommodate a replacement font. That is, using the embodiments described herein, the computing resources used for generating the content are themselves more efficiently utilized with respect to the amount of processing time and power consumption. The graphics design application is able to produce a greater number font suggestions that do not require substantial redesign of an existing layout so that the underlying platform is relieved of demands with respect to processing time and power that are consumed in editing a document are reduced. Moreover, with respect to embodiments that at least partially include cloud-based implementations, network traffic and demands bandwidth channels are reduced as convergence on an acceptable replacement font is more quickly obtained in fewer iterations.

Turning to FIG. 1, FIG. 1 depicts an example configuration of an operating environment 100 in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities are to be carried out by hardware, firmware, and/or software. For instance, in some embodiments, some functions are carried out by a processor executing instructions stored in memory, as further described with reference to FIG. 7, and/or within a cloud computing environment, as further described with respect to FIG. 8.

It should be understood that operating environment 100 shown in FIG. 1 is an example of one suitable operating environment. Among other components not shown, operating environment 100 includes a user device, such as user device 102, network 104, a data store 106, and one or more servers 108. Each of the components shown in FIG. 1 can be implemented via any type of computing device, such as one or more of computing device 700 described in connection to FIG. 7, and/or within a cloud computing environment 800, as further described with respect to FIG. 8, for example. These components communicate with each other via network 104, which includes one or more wired networks, one or more wireless networks, or a combination of both wired and wireless networks. In some embodiments, network 104 includes multiple networks and/or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, and/or access points (as well as other components) provide wireless connectivity. Networking environments are commonplace in offices, enterprise-wide computer networks, intranets, and the Internet. Accordingly, network 104 is not described in significant detail. It should be understood that any number of user devices, servers, and other components are employed within operating environment 100 within the scope of the present disclosure. Each component comprises a single device or multiple devices cooperating in a distributed environment.

The user device 102 includes one or more processors and one or more non-transient computer-readable media. The computer-readable media includes computer-readable instructions executable by the one or more processors. The instructions are embodied by one or more applications, such as application(s) 110 shown in FIG. 1. As shown in FIG. 1, in some embodiments, the application(s) 110 includes at least one graphics design application 112 that implements a design-aware substitute font-suggestion function 120. Graphics design application 112 is referred to as a single application for simplicity, but its functionality can be embodied by one or more applications 110 in practice. In some embodiments, one or more aspects of the graphics design application 112 are implemented by one or more server applications 109 executed on server(s) 108 that operate in conjunction with the graphics design application 112. In some implementations, the graphics design application 112 comprises a web application, which can run in a web browser and could be hosted at least partially on the server-side of environment 100. In addition, or instead, the graphics design application 112 can comprise a dedicated application, such as any application used for developing document layouts comprising frames of textual content and/or a combination of textual and graphics content.

In some embodiments, document layouts generated with graphics design application 112 are used to visually render content on a display device (e.g., a user display interface of user device 102). In some embodiments, document layouts generated with graphics design application 112 are used to render content physically in printed form on media such as, but not limited to, posters, pamphlets, product packaging, and books, for example. For example, graphics design application 112 can comprise a graphics design application, such as Adobe® Photoshop, Adobe® Illustrator and/or Adobe® InDesign, a word processing application, a page layout application, image editing application, or any application that similarly presents textual information in a layout that comprises text frames based on user-selected fonts. In some cases, the graphics design application 112 is integrated into the operating system (e.g., as a service). The graphics design application 112 can generally be any application capable of facilitating the design-aware substitute font-suggestion function 120, either on its own, or via an exchange of information between the user device 102 and a server 108. It is therefore contemplated herein that "application" be interpreted broadly. The document processed by graphics design application 112 can be obtained from a memory of the user device 102, or can be obtained from other sources. For example, in some embodiments the document is obtained from a memory of the user device 102, received from a data store 106, or obtained from server 108. In some embodiments, the initial glyphs specified by the document are included as embedded fonts where the metadata for rending textual content in the original font are included in the document. In other embodiments, the initial glyphs specified by the document refer to font files installed on the user device 102 for rendering the initial glyphs included in the document.

As an example, a user operating the graphics design application 112 (e.g., a content designer) may be working on a layout of a document that comprises multiple text frames that display textual information in an arrangement together with one or more graphical objects. In some embodiments, text frames comprise rectangular, polygonal, round, curved, or other shaped frames that define bounds within the document layout within which a string of text is displayed. In some embodiments, text frames are positioned to place text above, below, next to, or wrapped around other objects in the layout, such as graphical objects. In some scenarios, the user may want, or have the need, to replace the font currently being used to render the text of a text frame with a different font. For example, the original font specified for the document layout may be missing from a font library available to the graphics design application 112, or may have font licensing terms or restrictions that cause the user to wish to replace the original font with a similar looking substitute font. That said, even though the glyphs of two font sets when compared on a glyph-by-glyph comparison can appear quite similar to the human eye, small differences in glyph characteristics can accumulate so that a string of text may appear very different when rendered in a text frame, depending on which font is used. For example, a textual element that renders in two lines of text in a text frame using the original font might occupy three (or more) lines of text using a similar looking substitute font, or otherwise might appear more compressed or expanded with respect to spacing between glyphs, or have glyphs that comprise different values for ascenders, descenders, or tails. These and other font characteristics affect how a font, once a string of glyphs are combined together into textual context, affect layout because small differences in the characteristics of individual glyphs accumulate. Moreover, changes in how one text frame is rendered can have undesired cascading effects on other objects within the layout, such as causing other text frames to dislodge and/or undesired overlapping with other text frames and/or graphics objects.

Figure 5:
FIG. 5 is a diagram illustrating a user interface displaying a ranked listing of suggested font replacements, in accordance with embodiments of the present disclosure.

In embodiments, the graphics design application 112 operates in conjunction with the design-aware substitute font-suggestion function 120 to recommend to the user a ranked listing of substitute fonts that the user can use to replace an original font based on how well they replicate the visual appearance of the original string of textual content rendered in the text frame using the original font. As explained in greater detail below with respect to FIG. 2, the design-aware substitute font-suggestion function 120 holistically considers how the original string of text appears when re-rendered in a same-sized text frame using a potential replacement font. The analysis is performed by rendering a first image of the original text in a text frame using the original font, rendering a second image of the original text in the text frame using a potential substitute font, and performing a pixel-wise image similarity evaluation between the first and second images to compute a similarity score for each potential replacement font, and presents the user an interface from which they can evaluate their options for replacing the original font, and/or select the substitute font they wish to use for that text frame. Such a user interface is discussed below in more detail with respect to FIG. 5.

The ranked listing of suggested substitute fonts generated by the design-aware substitute font-suggestion function 120 provides the content designer with replacement font suggestions that maintain the overall visual appearance of the layout when used in place of the original font. As a result, efficiencies are realized in the utilization of the operating environment 100, user device 102, and the graphics design application 112 because the content designer is relieved of the need to perform the time-consuming process of hunting though a menu of available fonts to find a replacement font that works with their existing layout, and/or does not need to spend computer resources and/or time to alter an existing layout to accommodate a replacement font.

User device 102 can be any type of computing device capable of being operated by a user. For example, in some implementations, user device 102 is the type of computing device described in relation to FIG. 7. By way of example and not limitation, a user device is embodied as a personal computer (PC), a laptop computer, a mobile device, a smartphone, a tablet computer, a smart watch, a wearable computer, a headset, an augmented reality device, a personal digital assistant (PDA), an MP3 player, a global positioning system (GPS) or device, a video player, a handheld or communications device, a gaming device or system, an entertainment system, a vehicle computer system, an embedded system controller, a remote control, an appliance, a consumer electronic device, a workstation, any combination of these delineated devices, or any other suitable device.

Figure 2:
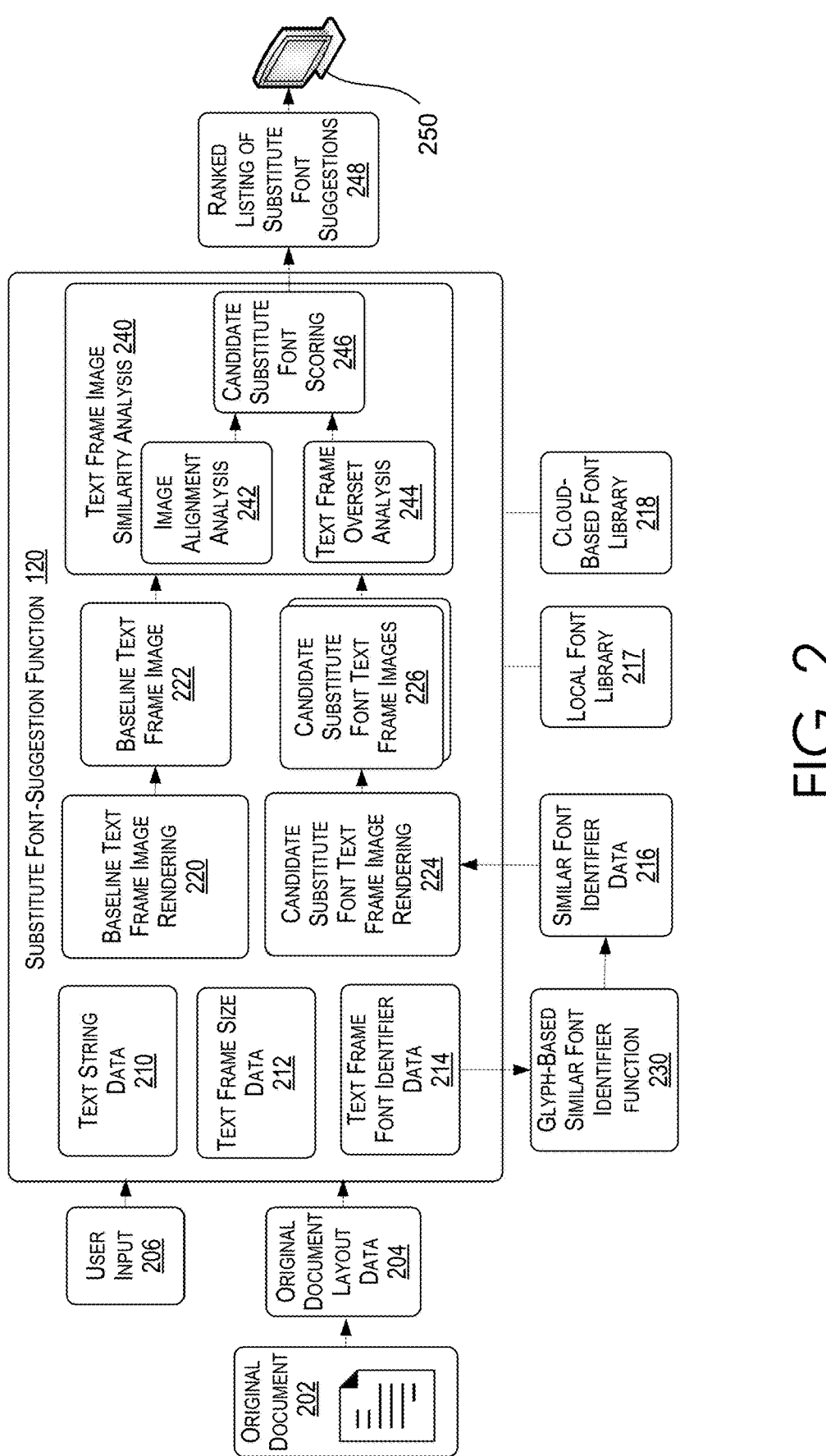
FIG. 2 is a block diagram illustrating an example substitute font-suggestion function, in accordance with embodiments of the present disclosure.

Referring now to FIG. 2, FIG. 2 is a diagram illustrating a substitute font-suggestion function 120, in accordance with embodiments of this disclosure. As shown in FIG. 2, in some embodiments, the information received by the substitute font-suggestion function 120 comprises original document layout data 204 corresponding to an original document 202 that displays textual information within one or more text frames. In some embodiments, when a user of the graphics design application 112 wishes to receive suggestions for potential replacement fonts for use in one of those text frames, they can enter user data 206 that indicates a selection of a text frame from the original document 202. Based on the selection, the substitute font-suggestion function 120 determines for the selected text frame: text string data 210, text frame size data 212 and/or text frame font identifier data 214. The substitute font-suggestion function 120 uses the text string data 210, text frame size data 212 and/or text frame font identifier data 214 to execute a baseline text frame image rendering 220 to generate a baseline text frame image 222 that represents the appearance of the user-selected text frame as it appears in the original document 202 with the original font. The substitute font-suggestion function 120 also receives similar font identifier data 216 that identifies a plurality of different fonts that can be considered as candidate replacement fonts. The similar font identifier data 216 can originate from a variety of possible sources. For example, in some embodiments the similar font identifier data 216 can comprise a listing of fonts selected and/or compiled by the user and/or another application 110. In the embodiments shown in FIG. 2, the similar font identifier data 216 is generated by a glyph-based similar font identifier algorithm 230, such as a font recommendation function implemented using Adobe® DeepFont, for example. For example, in some embodiments, the glyph-based similar font identifier algorithm 230 obtains the text frame font identifier data 214 that identifies the original font used for the selected text frame. The glyph-based similar font identifier algorithm 230 performs an initial preprocessing pass to identify other fonts that have a similar appearance as the original font at the glyph level (e.g., without other information about the actual text being rendered or the size/shape of the selected text frame) and generates the similar font identifier data 216. The substitute font-suggestion function 120 then evaluates the fonts identified by the similar font identifier data 216 within the context of the design and content of the original document to recommend replacement fonts that preserve the original appearance of the layout of the original document 202.

In some embodiments, using the similar font identifier data 216, the substitute font-suggestion function 120 executes a candidate substitute font text frame image rendering 224 to generate a plurality of candidate substitute font text images 226. In some embodiments, the candidate substitute font text frame image rendering 224 produces candidate substitute font text images 226 having the same pixel resolution as the baseline text frame image 222 to facilitate pixel-wise image similarity evaluation, as discussed herein. To decrease execution times and increase efficiency, in some embodiments, the substitute font-suggestion function 120 spawns a plurality of threads for executing multiple instances of the candidate substitute font text frame image rendering 224 in parallel, each thread producing one or more of the candidate substitute font text images 226. Each of the plurality of candidate substitute font text images 226 represent the appearance of the user-selected text frame with the original text from the original document 202, as it would appear rendered in the original text frame using a font identified by the similar font identifier data 216. In some embodiments, candidate substitute font text frame image rendering 224 is performed using fonts identified by the similar font identifier data 216 that are accessible to the graphics design application 112 and/or substitute font-suggestion function 120 from a local font library 217 (e.g., stored locally on user device 102) and/or from a cloud-based font library 218 (e.g., accessible via network 104 from server(s) 108 and/or data store 106). If the similar font identifier data 216 identifies a font not available for use by candidate substitute font text frame image rendering 224, the substitute font-suggestion function 120 can omit producing a candidate substitute font text image 226 for that font.

As shown in FIG. 2, each of the plurality of candidate substitute font text images 226 are individually assessed against the baseline text frame image 222 by the substitute font-suggestion function 120 using text frame image similarity analysis 240. In some embodiments, text frame image similarity analysis 240 includes image alignment analysis 242. Image alignment analysis 242 includes any image similarity algorithm that generates a score that indicates the degree of similarity between images. Image alignment analysis 242 performs, in some embodiments, a pixel-wise image similarity evaluation between the candidate substitute font text images 226 and the baseline text frame image 222 to compute a similarity score. Example algorithms for performing the image alignment analysis 242 include, but are not limited to, mean square error (MSE), peak signal-to-noise ratio (PSNR), and structural similarity index measurement (SSIM).

Figure 3A:
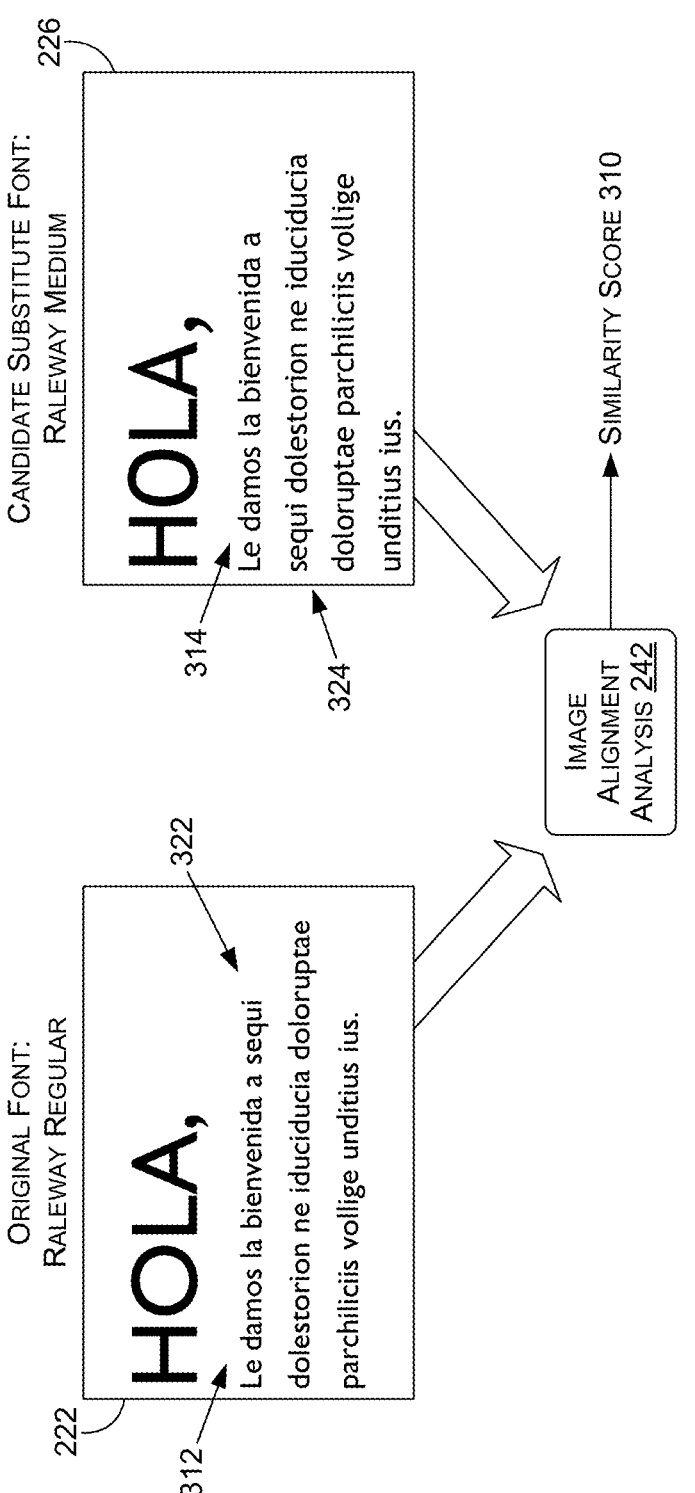
FIGS. 3A and 3B are diagrams illustrating image alignment analysis, in accordance with embodiments of the present disclosure.

For example, as shown in FIG. 3A, in some embodiments, the image alignment analysis 242 inputs the baseline text frame image 222 and generates an image similarity score 310. The similarity evaluation performed by the image alignment analysis 242 can perform a pixel-wise comparison, such as a comparison equivalent to overlaying the baseline text frame image 222 (e.g., using Raleway Regular) with a candidate substitute font text image 226 (e.g., using Raleway Medium) and generating a similarity score 310 based on a function of how many of the overlapping pixels agree between the two images and how many are different. For example, an MSE algorithm can generate a similarity score 310 by assigning a value of 1 when pixels between the images match and a value of 0 when they do not, and tallying the values across the image frames to produce a similarity score 310 for the candidate substitute font text image 226. In such an embodiment, the higher the similarity score 310, the better the match between the baseline text frame image 222 and the candidate substitute font text image 226. For example, in FIG. 3A, the text "Le damos la bienvenida a" shown at 312 in the baseline text frame image 222 appears at roughly the same position at 314 in the candidate substitute font text image 226, so that a high degree of pixel-wise matching can be expected to positively contribute to the value of the similarity score 310. However, the text "sequi" shown at 322 in the baseline text frame image 222 has shifted down a line to the position 324 shown in the candidate substitute font text image 226 (and displaced all the text that follows) so that a higher degree of pixel-wise mismatch can be expected that will not positively contribute to the value of the similarity score 310.

Figure 3B:
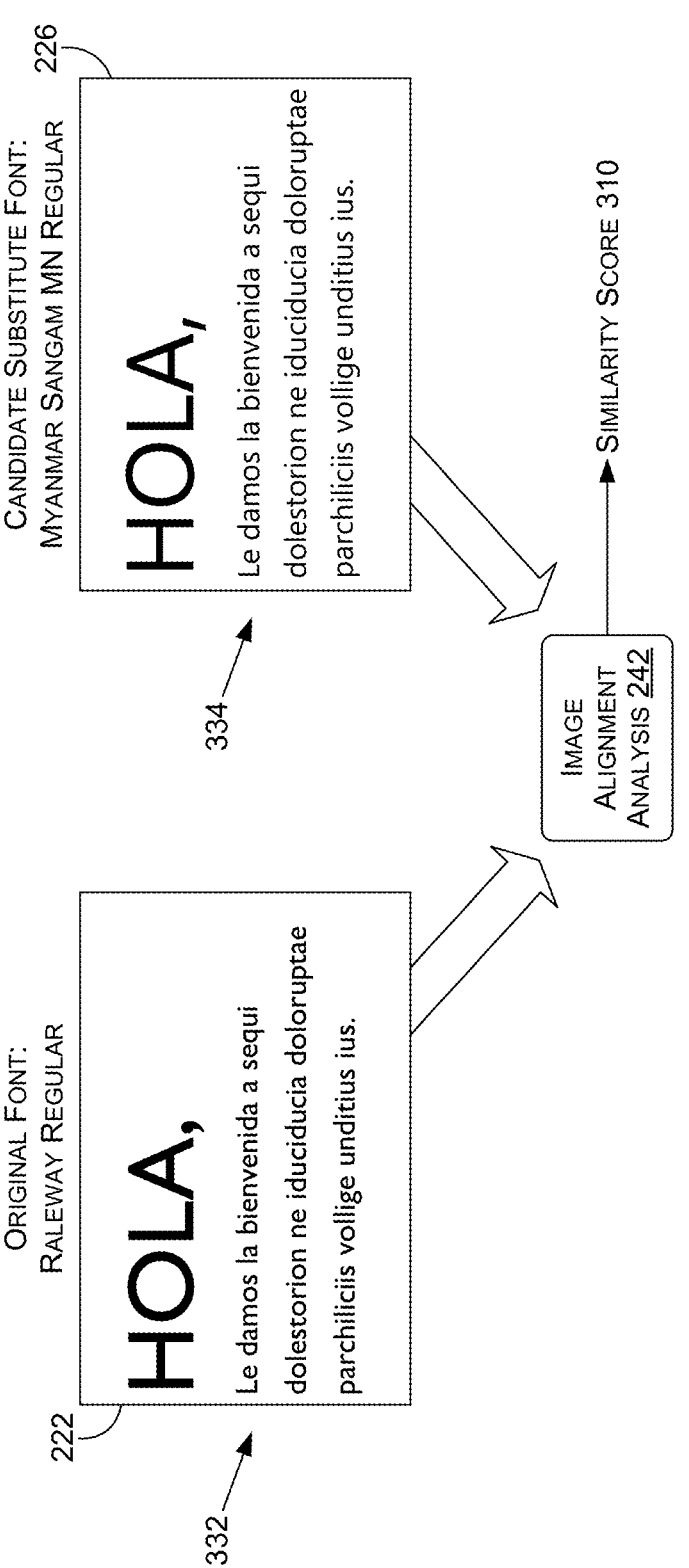

In contrast, in FIG. 3B, the image alignment analysis 242 inputs the baseline text frame image 222 (e.g., using Raleway Regular) and another candidate substitute font text image 226 (e.g., using Myanmar Sangam MN Regular). In this example, all of the text shown at 332 in the baseline text frame image 222 appears at roughly the same position at 334 in the candidate substitute font text image 226, resulting in a higher degree of pixel-wise matching than in the example of FIG. 3A. Accordingly, the similarity score 310 computed by the image alignment analysis 242 from the example of FIG. 3B will indicate greater similarity (e.g., a higher similarity score) than computed for the example of FIG. 3A.

In some embodiments, text frame image similarity analysis 240 includes text frame overset analysis 244. Text frame overset occurs when rendering a text string using a font causes the text to exceed the space available within the text frame. For example, if a text string comprises 100 words and the text takes more room when rendered in a candidate substitute font than when rendered with the original font, then text can spill out of the text frame, causing an overset. Referring to FIG. 4, FIG. 4 illustrates an example of text frame overset evaluated using text frame overset analysis 244. In this example, at 410, the baseline text frame image 222 is shown at 410, with the original text string 412 rendered in the original font (e.g., Raleway Regular) contained within the bounds of the text frame 414. At 420, a first candidate substitute font text image 226 is illustrated, where the original text string 412 is rendered using a first candidate substitute font (e.g., Raleway Medium). As shown at 422, the original text 412 rendered in the first candidate substitute font exceeds the space available within text frame 414 such that at least a portion of the original text 412 spills out from the text frame 414. In some embodiments, the text frame overset analysis 244 applies a qualitative penalty flag or classification to the first candidate substitute font, indicating that the font causes text frame overset, which can be used to penalize its priority in the ranked listing of font suggestions, as further discussed below. In some embodiments, the text frame overset analysis 244 determines a quantitative penalty value representing the degree of overset occurring (e.g., based on number of words and/or the percent of the original text that has overflowed from the text frame), which can be used to penalize its priority in the ranked listing of font suggestions, as further discussed below. In contrast, at 430, a second candidate substitute font text image 226 is illustrated, where the original text string 412 is rendered using a second candidate substitute font (e.g., Myanmar Sangam MN Regular). As shown at 432, the original text 412 rendered in the second candidate substitute font does not exceed the space available within text frame 414, and therefore does not incur either a qualitative or quantitative overset penalty.

Returning again to FIG. 2, the text frame image similarity analysis 240 includes a candidate substitute font scoring function 246 that generates a ranked listing of substitute font suggestions 248 based on the evaluations of the image alignment analysis 242 and/or the text frame overset analysis 244. For example, the candidate substitute font scoring function 246 can generate a similarity-based ranking of the fonts used to generate the candidate substitute font text frame images 226 based on the similarity scores computed for each by the image alignment analysis 242. In some embodiments, the candidate substitute font scoring function 246 applies a penalty to the ranking of those fonts that caused text frame overset so that fonts causing text frame overset appear lower in the ranked listing of substitute font suggestions 248 than those that do not. In some embodiments, the candidate substitute font scoring function 246 computes a compound similarity score that adjusts the similarity scores based on the results of the text frame overset analysis 244 and generates the ranked listing of substitute font suggestions 248 based on the compound similarity score. As an example, in some embodiments the candidate substitute font scoring function 246 applies a predetermined penalty to the similarity score of font that produces text frame overset that lowers the ranking of those fonts in the ranked listing of substitute font suggestions 248. In some embodiments, the candidate substitute font scoring function 246 penalizes the similarity score of a font that produces text frame overset based on the quantitative penalty value representing the degree of overset occurring for that font determined by the text frame overset analysis 244. In some embodiments, the candidate substitute font scoring function 246 can adjust the ranking of fonts listed in the ranked listing of substitute font suggestions 248 based on font style. For example, in one or more embodiments, the candidate substitute font scoring function 246 adjusts the similarity score of fonts having the same font style of the original font (e.g., Bold, Italics, Regular, SemiBold, etc.) to boost the ranking of those fonts within the ranked listing of substitute font suggestions 248 in comparison to those fonts having a different font style from the original font.

In some embodiments, the ranked listing of substitute font suggestions 248 is presented to a user of the graphics design application 112 via a human-machine interface (HMI) 250 (e.g., a display device component of the user device 102). In some embodiments, the graphics design application 112 generates a user interface (e.g., a dropdown menu) that permits the user to select a replacement font from the ranked listing of substitute font suggestions 248 for the text frame selected by the user. Upon selection, the graphics design application 112 replaces the font used to render the text within the selected text frame using the replacement font selected by the user. For example, referring now to FIG. 5, FIG. 5 at 500 illustrates a user interface 510 generated on a human-machine interface 250 of user device 102 for presenting to a user a ranked listing of substitute font suggestions 520 generated by the substitute font-suggestion function 120, in accordance with embodiments of this disclosure. In this embodiment, the user interface 510 comprises a user selection menu 512 that displays at least a portion of the font recommendation provided by the ranked listing of substitute font suggestions 248. The substitute font suggestions 520 displayed by the user selection menu 512 are prioritized and displayed in a ranked order of similarity as determined by the text frame image similarity analysis so that the selection of substitute font suggestions appearing at the top of the user selection menu 512 will render the original text with an appearance in the document layout that more faithfully preserves the original appearance of the layout of the original document 202, as compared to substitute font suggestions appearing further down on the user selection menu 512. In some embodiments, substitute font suggestions from the ranked listing of substitute font suggestions 248 that do not cause text frame overset are presented on the user selection menu 512 in a first listing of substitute font suggestions 521 that appear in the user selection menu 512, prior to a second listing of font substitute suggestions 522 from the ranked listing of substitute font suggestions 248 that do cause text frame overset. In some embodiments, substitute font suggestions from the ranked listing of substitute font suggestions 248 that have the same font style as the original font are listed in the user selection menu 512 with a higher ranking than those that have a different font style from the original font. In some embodiments, the graphics design application 112 displays a selection tool 530 (e.g., a pointer), which is controlled by the user to select a substitute font suggestion from the user selection menu. Upon selection, the graphics design application 112 replaces the font used to render the text within the selected text frame using the replacement font selected by the user. In some embodiments, the number of substitute font suggestions generated by the substitute font-suggestion function 120 and/or displayed by the user interface is controlled by the user via a user preference.

Referring now to FIG. 6, FIG. 6 is a flow chart illustrating an example method 600 for generating design-aware replacement font suggestions, in accordance with embodiments of the present disclosure. It should be understood that the features and elements described herein with respect to the method 600 of FIG. 6 can be used in conjunction with, in combination with, or substituted for elements of any of the other embodiments discussed herein and vice versa. Further, it should be understood that the functions, structures, and other descriptions of elements for embodiments described in FIG. 6 can apply to like or similarly named or described elements across any of the figures and/or embodiments described herein and vice versa. In some embodiments, elements of method 600 are implemented utilizing graphics design application 112 and/or design-aware substitute font-suggestion function 120 disclosed herein, or another processing device implementing embodiments disclosed by the present disclosure.

Method 600, at 602, includes receiving document layout data comprising at least one text frame populated with a text string using a first font. For example, in some embodiments, document layout data received by a substitute font-suggestion function corresponds to an original document that displays textual information within one or more text frames. In some embodiments, when a user wishes to receive suggestions for potential replacement fonts for use in one of those text frames, they can select at least one text frame from the original document. Based on the selection, the substitute font-suggestion function determines for the selected text frame(s) document layout data that includes the text string appearing in the text frame(s), at least one dimension corresponding to a size of the selected text frame(s), and an identification of the first font used in the text frame(s).

Method 600, at 604, includes receiving font data comprising a plurality of font identifiers. For example, in some embodiments a substitute font-suggestion function receives font identifiers, such as the similar font identifier data 216, that identifies a plurality of different fonts that can be considered as candidate replacement fonts for the original font. The font data can originate from a variety of possible sources. For example, in some embodiments the font data comprises a listing of fonts selected and/or compiled by the user and/or another application or process. In some embodiments, the font identifiers include the similar font identifier data generated by a font-suggestion algorithm based on the original font, such as a font recommendation function implemented using Adobe® DeepFont, for example.

Method 600, at 606, includes generating a first image of the at least one text frame including the text string using the first font. In some embodiments, the substitute font-suggestion function uses the text string data, text frame size data, and/or text frame font identifier data to generate a baseline text frame image (e.g., baseline text frame image 222) that represents the appearance of the user-selected text frame as it appears in the original document 202 with the original font.

Method 600, at 608, includes generating a plurality of second images of the text string, wherein individual second images of the plurality of second images render the text string using a respective font based on the plurality of font identifiers. In some embodiments, using the plurality of font identifiers from the font data, the substitute font-suggestion function generates a plurality of candidate substitute font text images (e.g., candidate substitute font text images 226). In some embodiments, the plurality of candidate substitute font text images have the same pixel resolution as the baseline text frame image to facilitate image alignment analysis (such as pixel-wise image similarity evaluation), as discussed herein. To decrease execution times and increase efficiency, in some embodiments the method includes spawning a plurality of threads to execute code to generate the plurality of second images and generating the ranking for each of the plurality of font identifiers. The threads are executed in parallel, with each thread producing one or more of the candidate substitute font text images 226. Each of the plurality of candidate substitute font text images represents the appearance of the user-selected text frame with the original text from the original document, as it would appear rendered in the original text frame using a font identified by the font data. In some embodiments, the candidate substitute font text images are generated using font definitions from a cloud-based font library and/or a local font library stored by at least one memory component of the local user device.

Method 600, at 610, includes generating a ranking of the plurality of font identifiers based on computing a score for each of the individual second images that represents a pixel-wise alignment between the first image and the individual second images. As discussed with respect to FIGS. 3A and 3B, the score can be a similarity score computed by executing an image similarity algorithm (e.g., a mean square error (MSE), peak signal-to-noise ratio (PSNR), and/or structural similarity index measurement (SSIM) to compute the score for each of the individual second images based on an alignment of pixels between the first image and the individual second images. As discussed with respect to FIG. 4, in some embodiments, generating the ranking is further based on a text frame overset evaluation applied to the individual second images, the text frame overset evaluation based at least on one or more dimensions of the at least one text frame. In some embodiments, the method adjusts the score based on a degree of text frame overset determined from the text frame overset evaluation. In some embodiments, generating the ranking is further based on a comparison of a font style of the first font to a respective font style of individual fonts identified by the plurality of font identifiers.

Method 600, at 612, includes causing a user interface to display a listing of fonts in an order based on the ranking of the plurality of font identifiers. In some embodiments, substitute font suggestions are displayed in a user interface as discussed with respect to FIG. 5. Displaying the ranked listing of suggested substitute fonts to a user interface provides the user of the graphics design application with replacement font suggestions that maintain the overall visual appearance of the layout when used in place of the original font. As a result, efficiencies are realized in the utilization of the operating environment 100, user device 102, and the graphics design application 112 because the content designer is relieved of the need to use those resources to perform the time-consuming process of hunting though a menu of available fonts to find a replacement font that works with their existing layout, and/or the need to spend computer resources and/or time to alter an existing layout to accommodate a replacement font.

Figure 7:
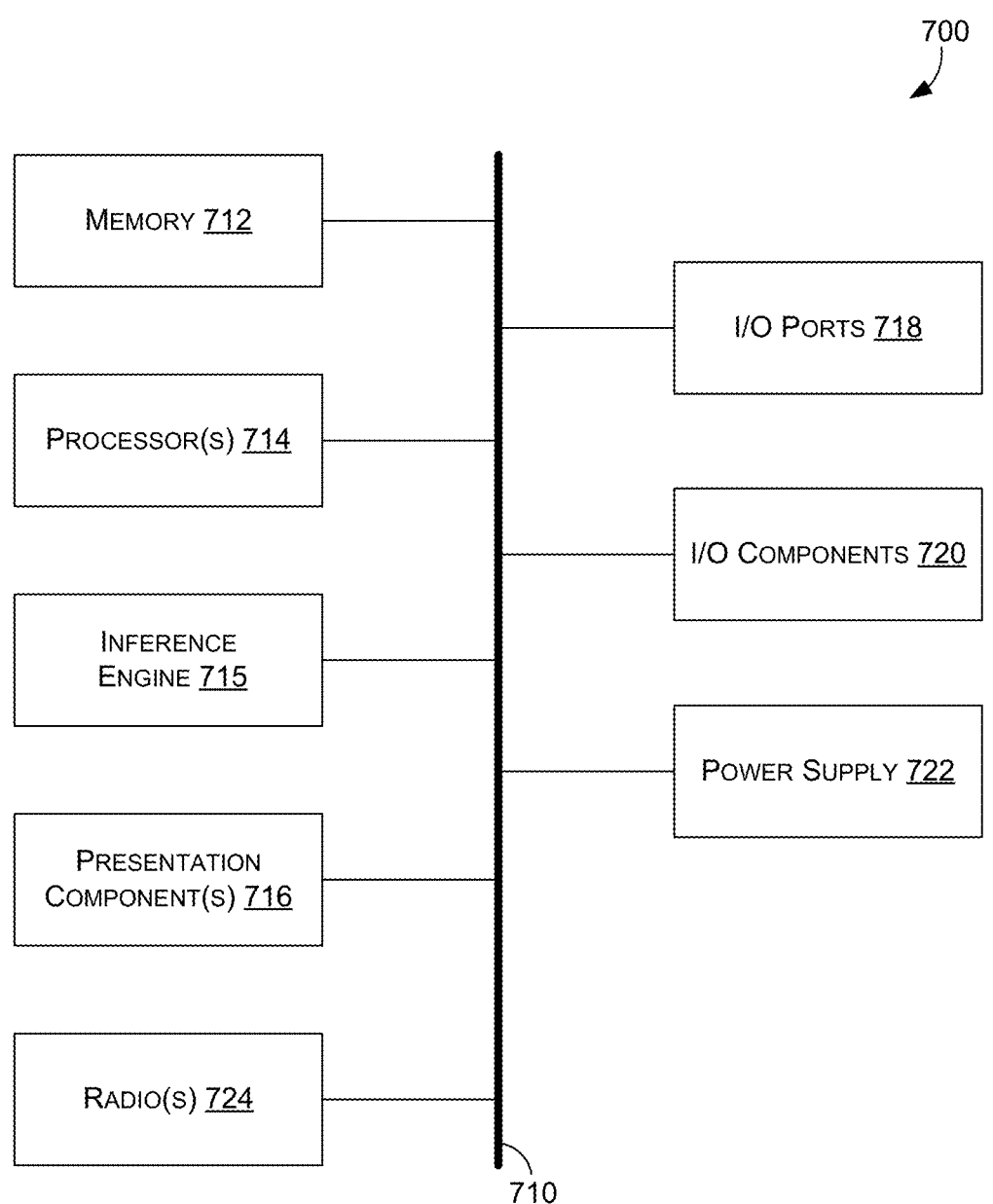
FIG. 7 is a diagram illustrating an example computing environment in accordance with embodiments of the present disclosure.

With regard to FIG. 7, one exemplary operating environment for implementing aspects of the technology described herein is shown and designated generally as computing device 700. Computing device 700 is just one example of a suitable computing environment and is not intended to suggest any limitation as to the scope of use or functionality of the technology described herein, and neither should the computing device 700 be interpreted as having any dependency or requirement relating to any one or combination of components illustrated.

The technology described herein can be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein can be practiced in a variety of system configurations, including handheld devices, consumer electronics, general-purpose computers, and specialty computing devices. Aspects of the technology described herein can also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714 (e.g., processing devices), a neural network inference engine 715, one or more presentation components 716, input/output (I/O) ports 718, I/O components 720, an illustrative power supply 722, and a radio(s) 724. Bus 710 represents one or more buses (such as an address bus, data bus, or combination thereof). Although the various blocks of FIG. 7 are shown with lines for the sake of clarity, it should be understood that one or more of the functions of the components can be distributed between components. For example, a presentation component 716 such as a display device can also be considered an I/O component 720. The diagram of FIG. 7 is merely illustrative of an exemplary computing device that can be used in connection with one or more aspects of the technology described herein. Distinction is not made between such categories as "workstation," "server," "laptop," "tablet," "smart phone" or "handheld device," as all are contemplated within the scope of FIG. 7 and refer to "computer" or "computing device."

Memory 712 includes non-transient (e.g., non-transitory) computer storage media in the form of volatile and/or non-volatile memory. The memory 712 can be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. In some embodiments, one or more aspects of application(s) 110, graphics design application 112, and/or design-aware substitute font-suggestion function 120 are implemented at least in part by the processors 714.

Presentation component(s) 716 present data indications to a user or other device, and in some embodiments, comprises an HMI display used by graphics design application 112 to display documents and/or substitute font recommendations generated by design-aware font suggestion, as described herein. In some embodiments, HMI 250 is implemented using presentation component(s) 716. Neural network inference engine 715 comprises a neural network coprocessor, such as but not limited to a graphics processing unit (GPU) configured to execute a deep neural network (DNN) and/or machine learning models. Exemplary presentation components 716 include a display device, speaker, printing component, and vibrating component. I/O port(s) 718 allow computing device 700 to be logically coupled to other devices, including I/O components 720, some of which can be built in.

Illustrative I/O components include a microphone, joystick, game pad, satellite dish, scanner, printer, display device, wireless device, a controller (such as a keyboard and a mouse), a natural user interface (NUI) (such as touch interaction, pen or stylus gesture, and gaze detection), and the like. In aspects, a pen digitizer (not shown) and accompanying input instrument (also not shown but which can include, by way of example only, a pen or a stylus) are provided in order to digitally capture freehand user input. The connection between the pen digitizer and processor(s) 714 can be direct or via a coupling utilizing a serial port, parallel port, and/or other interface and/or system bus known in the art. Furthermore, the digitizer input component can be a component separated from an output component, such as a display device, or in some aspects, the usable input area of a digitizer can be coextensive with the display area of a display device, integrated with the display device, or can exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs can be interpreted as ink strokes for presentation in association with the computing device 700. These requests can be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700, in some embodiments, is equipped with depth cameras, such as stereoscopic camera systems, infrared camera systems, RGB camera systems, and combinations of these, for gesture detection and recognition. Additionally, the computing device 700, in some embodiments, is equipped with accelerometers or gyroscopes that enable detection of motion. The output of the accelerometers or gyroscopes can be provided to the display of the computing device 700 to render immersive augmented reality or virtual reality. A computing device, in some embodiments, includes radio(s) 724. The radio 724 transmits and receives radio communications. The computing device can be a wireless terminal adapted to receive communications and media over various wireless networks (e.g., network 104).

Figure 8:
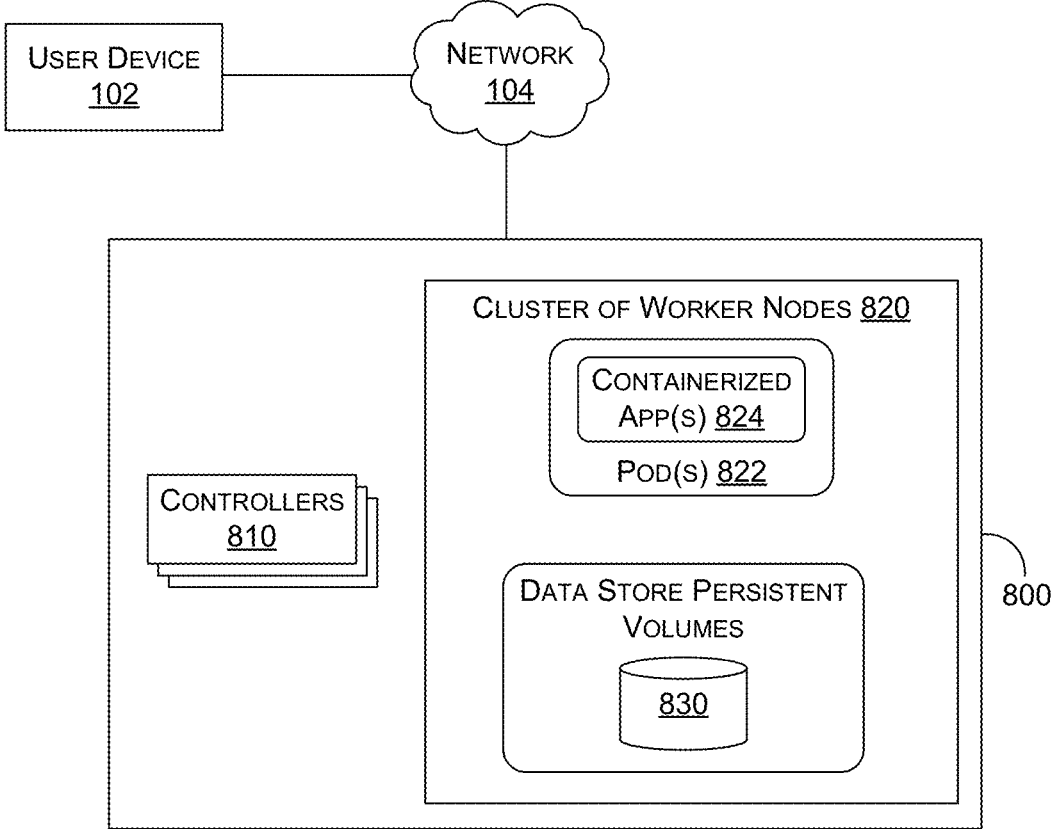
FIG. 8 is a diagram illustrating an example cloud-based computing environment in accordance with embodiments of the present disclosure.

FIG. 8 is a diagram illustrating a cloud-based computing environment 800 for implementing one or more aspects of the application(s) 110, graphics design application 112, and/or design-aware substitute font-suggestion function 120 discussed with respect to any of the embodiments discussed herein. Cloud-based computing environment 800 comprises one or more controllers 810 that each comprises one or more processors and memory, each programmed to execute code to implement at least part of the design-aware substitute font-suggestion function 120. In one embodiment, the one or more controllers 810 comprise server components of a data center. The controllers 810 are configured to establish a cloud base computing platform executing the graphics design application 112 and/or design-aware substitute font-suggestion function 120. For example, in one embodiment the graphics design application 112 and/or design-aware substitute font-suggestion function 120 are virtualized network services running on a cluster of worker nodes 820 established on the controllers 810. For example, the cluster of worker nodes 820 can include one or more of Kubernetes (K8s) pods 822 orchestrated onto the worker nodes 820 to realize one or more containerized applications 824 for the graphics design application 112 and/or design-aware substitute font-suggestion function 120. In some embodiments, the user device 102 can be coupled to the controllers 710 by network 104 (for example, a public network such as the Internet, a proprietary network, or a combination thereof). In such an embodiment, one or both of the graphics design application 112 and/or design-aware substitute font-suggestion function 120 are at least partially implemented by the containerized applications 824. In some embodiments, the cluster of worker nodes 820 includes one or more data store persistent volumes 830 that implement the data store 106.

In various alternative embodiments, system and/or device elements, method steps, or example implementations described throughout this disclosure (such as the graphics design application and/or design-aware substitute font-suggestion function, or any of the modules or sub-parts of any thereof, for example) can be implemented at least in part using one or more computer systems, field-programmable gate arrays (FPGAs), application-specific integrated circuits (ASICs), or similar devices comprising a processor coupled to a memory and executing code to realize those elements, processes, or examples, said code stored on a non-transient hardware data storage device. Therefore, other embodiments of the present disclosure can include elements comprising program instructions residing on computer-readable media that, when implemented by such computer systems, enable them to implement the embodiments described herein. As used herein, the terms "computer-readable media" and "computer storage media" refer to tangible memory storage devices having non-transient physical forms and includes both volatile and non-volatile, removable and non-removable media. Such non-transient physical forms can include computer memory devices, such as but not limited to: punch cards, magnetic disk or tape, or other magnetic storage devices, any optical data storage system, flash read-only memory (ROM), non-volatile ROM, programmable ROM (PROM), erasable-programmable ROM (E-PROM), electrically erasable programmable ROM (EEPROM), random-access memory (RAM), CD-ROM, digital versatile disks (DVDs), or any other form of permanent, semi-permanent, or temporary memory storage system of a device having a physical, tangible form. By way of example, and not limitation, non-transitory computer-readable media can comprise non-transitory computer storage media and communication media. Computer storage media does not comprise a propagated data signal. Program instructions include, but are not limited to, computer-executable instructions executed by computer system processors and hardware description languages such as Very High Speed Integrated Circuit (VHSIC) Hardware Description Language (VHDL).

In the above detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments can be utilized and that logical, mechanical, and electrical changes can be made without departing from the scope of the present disclosure. The detailed description is, therefore, not to be taken in a limiting sense. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and can be employed without reference to other features and subcombinations and are contemplated within the scope of the claims.

What is claimed is:

1. A system comprising:

at least one memory component; and one or more processing devices coupled to the at least one memory component, the one or more processing devices to perform operations comprising:

receiving document layout data comprising at least one text frame populated with a text string using a first font, wherein the at least one text frame defines bounds within a document layout within which the text string is displayed;

receiving font data comprising a plurality of font identifiers;

generating a first image of the at least one text frame including the text string using the first font;

generating a plurality of second images of the text string, wherein individual second images of the plurality of second images render the text string, within the bounds defined by the at least one text frame, using a respective second font based on the plurality of font identifiers;

generating a ranking of the plurality of font identifiers based on computing a score for each of the individual second images that represents a pixel-wise alignment between the at least one text frame as rendered in the first image and the at least one text frame as rendered in the individual second images; and causing a user interface to display a listing of fonts in an order, wherein the order is based on a similarity of the at least one text frame as rendered in the first image and the at least one text frame as rendered in the individual second images as determined from the ranking of the plurality of font identifiers.

2. The system of claim 1, the operations further comprising:

generating the ranking further based on a text frame overset evaluation applied to the individual second images, the text frame overset evaluation based at least on one or more dimensions of the at least one text frame.

3. The system of claim 2, the operations further comprising:
adjusting the score based on a degree of text frame overset determined from the text frame overset evaluation.

4. The system of claim 1, wherein the document layout data comprises at least one of:
the text string appearing in the at least one text frame;
at least one dimension corresponding to a size of the at least one text frame; and
an identification of the first font.

5. The system of claim 1, wherein the font data identifies a plurality of fonts generated by a font-suggestion algorithm based on the first font.

6. The system of claim 1, the operations further comprising:
executing an image similarity algorithm to compute the score for each of the individual second images based on an alignment of pixels between the first image and the individual second images.

7. The system of claim 1, the operations further comprising:
generating the ranking further based on a comparison of a font style of the first font to a respective font style of individual fonts identified by the plurality of font identifiers.

8. The system of claim 1, the operations further comprising:
generating at least one of the plurality of second images based on a font definition from a cloud-based font library, or a font library stored by the at least one memory component.

9. The system of claim 1, the operations further comprising:
spawning a plurality of threads to execute code to generate the plurality of second images and generating the ranking for each of the plurality of font identifiers.

10. The system of claim 1, the operations further comprising:
generating the ranking further based on a comparison of a font style of the first font to a respective font style of individual fonts identified by the plurality of font identifiers; and
generating the ranking further based on a text frame overset evaluation applied to the individual second images, the text frame overset evaluation based at least on one or more dimensions of the at least one text frame.

11. A method comprising:
generating a first image based on document layout data comprising at least one text frame populated with a text string rendered using a first font, wherein the at least one text frame defines bounds within a document layout within which the text string is displayed;
generating a plurality of second images of the text string, wherein individual second images of the plurality of second images render the text string, within the bounds defined by the at least one text frame, using a respective second font based on font data comprising a plurality of font identifiers and at least one dimension corresponding to a size of the at least one text frame;
determining a ranking for each of the plurality of font identifiers based at least on a pixel-wise alignment between the at least one text frame as rendered in the first image and at least one text frame as rendered in the individual second images of the plurality of second images; and
causing a user interface to display a listing of fonts in an order, wherein the order is based on a similarity of the at least one text frame as rendered in the first image and the at least one text frame as rendered in the individual second images as determined from the ranking for each of the plurality of font identifiers.

12. The method of claim 11, the method further comprising:
adjusting the ranking based on a degree of text frame overset determined from a text frame overset evaluation applied to the individual second images.

13. The method of claim 11, wherein the font data identifies a plurality of fonts generated by a font-suggestion algorithm based on the first font.

14. The method of claim 11, the method further comprising:
executing an image similarity algorithm to compute a score for each of the individual second images based on an alignment of pixels between the first image and the individual second images, wherein the ranking is based at least on the score.

15. The method of claim 11, the method further comprising:
generating the ranking further based on a comparison of a font style of the first font to a respective font style of individual fonts identified by the plurality of font identifiers.

16. The method of claim 11, the method further comprising:
generating at least one of the plurality of second images based on a font definition from a cloud-based font library or a locally stored font library.

17. A non-transitory computer-readable medium storing executable instructions, that when executed by a processing device, cause the processing device to perform operations comprising:
generating a first image based on document layout data comprising a text frame populated with a text string rendered using a first font, wherein the text frame defines bounds within a document layout within which the text string is displayed;
generating a plurality of second images of the text string, wherein individual second images of the plurality of second images render the text string, within the bounds defined by the text frame, using a respective second font identified by font data comprising a plurality of font identifiers;
determining a ranking for the plurality of font identifiers based on a similarity evaluation between the text frame as rendered in the first image and the text frame as rendered in the individual second images and further based on a text frame overset evaluation applied to the individual second images; and
causing a user interface to display a ranked listing of fonts in an order, wherein the order is based on a similarity of the text frame as rendered in the first image and the text frame as rendered in the individual second images as determined from the ranking for the plurality of font identifiers.

18. The non-transitory computer-readable medium of claim 17, the operations further comprising:

determining the ranking based on computing a score for each of the individual second images that represents a pixel-wise alignment between the first image and the individual second images.

19. The non-transitory computer-readable medium of claim 17, the operations further comprising:

generating the individual second images with a pixel resolution matching the pixel resolution of the first image.

20. The non-transitory computer-readable medium of claim 17, the operations further comprising:

generating the ranking further based on a comparison of a font style of the first font to a respective font style of individual fonts identified by the plurality of font identifiers.

\* \* \* \* \*